May 5, 1931.  C. H. STERLING  1,803,949
OVERGEAR TRANSMISSION
Filed Jan. 12, 1927

Inventor
Claude H. Sterling
By Blackmore, Spencer & Hulse
Attorneys

Patented May 5, 1931

1,803,949

UNITED STATES PATENT OFFICE

CLAUDE H. STERLING, OF DETROIT, MICHIGAN, ASSIGNOR TO GENERAL MOTORS CORPORATION, OF DETROIT, MICHIGAN, A CORPORATION OF DELAWARE

OVERGEAR TRANSMISSION

Application filed January 12, 1927. Serial No. 160,620.

This invention relates to power transmission and has been designed to provide a variable speed transmission mechanism for motor vehicles.

The object of the invention is to secure a variable speed transmission having four speeds. As a further object the invention seeks to get a quiet drive for the gear trains giving the higher speed ratios. As other objects, compactness, easy gear shifting, and convenience in manufacture and assembly may be enumerated.

The invention will be understood upon a reading of the following specification and an examination of the accompanying drawing.

In the drawings Figure 1 is a longitudinal vertical section through a vehicle transmission embodying my invention.

Figure 4:
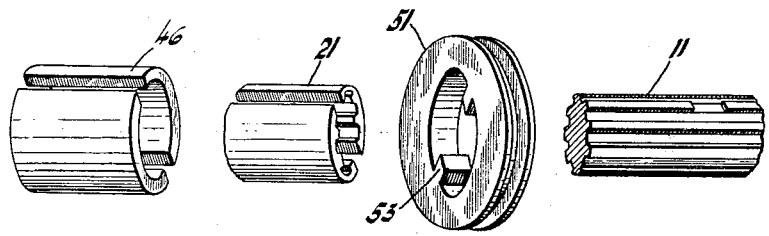
Figure 4 is a perspective of parts disassembled.
Figure 1:
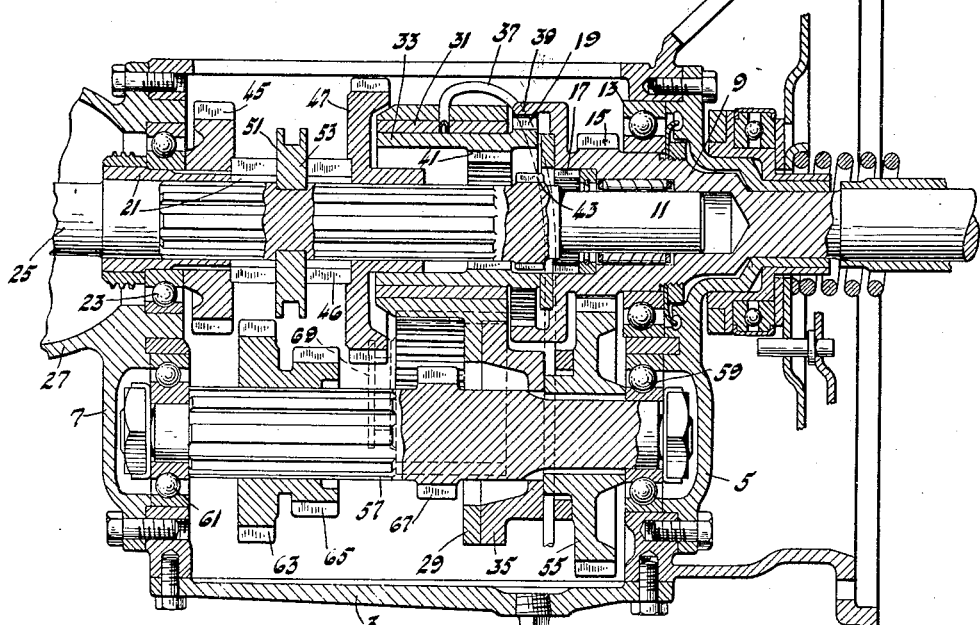
Figure 3:
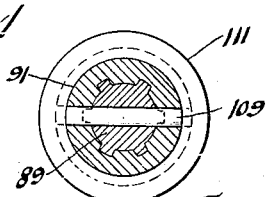
Figure 3 is a section on line 3—3 of Figure 2.

Referring first to Figure 1, numeral 3 designates a transmission housing having a front wall 5 and a rear wall 7. Through the front wall passes a clutch driven shaft 9 having its end enlarged and open to receive the front end of a spline shaft 11. The clutch shaft 9 is journalled in bearings 13 in the front housing wall beyond which it is formed with external gear teeth 15, internal teeth 17, and with a radial flange terminating in an internal gear 39.

The spline shaft is slidable in a sleeve 21 rotatably mounted in bearings 23 in the rear wall of the housing. The sleeve outside the housing is formed with a part 25 which may cooperate with parts on the propeller shaft, not shown, constituting a universal joint, the joint being enclosed by a housing member 27 forming a part of the rear wall 7. An intermediate partition 29 has an opening eccentric to the aligned shafts. In the opening an annular bearing 31 and a gear ring 33 are shown. An oil pump, not illustrated, may be provided in a part 35 associated with partition 29. From the oil pump there extends a pipe 37 to lubricate the bearing surfaces between parts 31 and 33. The gear ring has an external gear 19 at one end engaging the internal gear 39, and within the gear ring is an internal gear 41. The splined shaft has integrally formed external teeth 43. In one forward position of the spline shaft teeth 43 engage teeth 17 whereupon the clutch shaft is directly connected to the spline shaft and rotates the latter. Sleeve 21 is thus rotated. This gives a direct drive between the driving and driven shafts. A rearward movement of the spline shaft brings into engagement teeth 41 and 43. The spline shaft is then speeded above the clutch shaft being driven through two external-internal gear trains.

Keyed to sleeve 21 is a gear 45 and held from rotation on the spline shaft is a gear 47. The sleeve 21 extends forwardly to the last named gear and is provided with diametrically opposed slots. Surrounding the sleeve 21 and between gear 45 and 47 is a split bushing 46 consisting of two brasses, the adjacent edges of which are spaced apart when assembled, thereby leaving diametrically opposite slots registering with the slots in the sleeve. The ends of the split bushing are received in recesses in the gears 45—47 as illustrated. Surrounding the split bushing is a collar 51 having diametrically opposite radial lugs 53 passing through the slots of the split bushing and of the sleeve and entering recesses cut into the splines of the spline shaft. A suitable fork, not shown, engages the collar and moves it and thus reciprocates the shaft through the sleeve to get the direct and overgear drives. In assembling the parts the collar may first be assembled on the spline shaft, its lugs 53 moving along in the depressions between the splines until they reach a point opposite the notches cut into the splines. The collar is then turned so that its lugs enter the notches and complete the splines. The brasses constituting the split bushing may then be assembled around the slotted end of the sleeve, the slots of the bushing and sleeve registering. This assembly may then be slipped over the spline shaft and pushed along the shaft through the collar until these parts reach the gear 47. When so pushed, the collar is locked from rotation as well as from longitudinal movement relative to the spline shaft, and yet may move the spline shaft relative to the sleeve, the lugs 53 moving through the slots of the bushing and sleeve.

Gear 15 drives gear 55 on the countershaft 57, the latter journalled at 59 and 61 in the transmission housing. The countershaft has slidable gears 63 and 65 to engage gears 45 and 47 on the sleeve and spline shaft respectively, these gear engagements giving second speed and low speed.

Reverse driving may be had by means of gear 67 on the countershaft, a sliding idler gear 69 shown in dotted lines being interposed between gears 67 and 47.

The structure described gives a third speed by means of a direct clutch connection between the driving and driven shafts and an over-gear through a double external-internal gear train, thus assuring a quiet drive for third speed and fourth speed.

Compactness is accomplished by making small gear 43 integral with the spline shaft. The fact that it is integral makes possible a minimum size for this gear and also of the gear ring with which gear 45 engages. The overall dimensions may thus be materially reduced. Since the gear is integral with instead of slidable upon the spline shaft, provision must be made for sliding the spline shaft itself. This sliding movement has been accomplished as explained by the use of sleeve 21 and the connections including the collar 51 and the split bushing 46.

Figure 2:
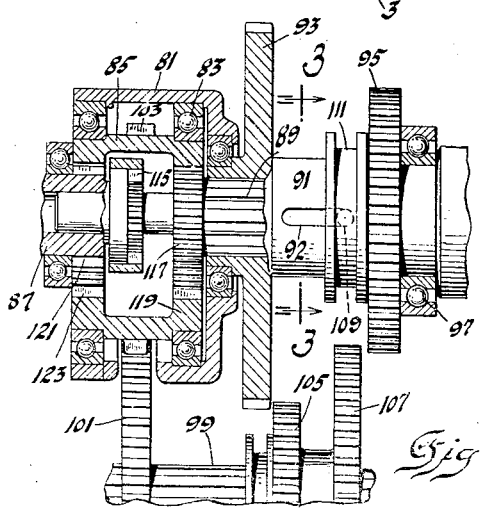
Figure 2 is a similar view of a modified form, parts being broken away.

Figure 2 shows a somewhat modified form. In this form in the housing 81 bearings 83 rotatably carry a ring gear 85 disposed eccentrically about drive shaft 87 and driven spline shaft 89. Surrounding the spline shaft 89 is a sleeve or hub 91 carrying spaced gears 93 and 95. Hub 91 rotates with the spline shaft and extends through bearings 97 beyond which it may be connected with the propeller shaft not shown. At 99 is a spline countershaft carrying a gear 101 driven by a gear 103 on the ring gear 85. Combined gears 105 and 107 are slidably mounted on the countershaft to drive gears 93 and 95 carried by the sleeve and giving a low speed and second speed drive.

The hub 91 is slotted as shown at 92 and one or more pins 109 carried radially by the collar 111 extend through the slot 92 and into the spline shaft 89. Movement of the collar axially by means of the usual fork, not shown, reciprocates the spline shaft. An internal tooth clutch 115 on the driving shaft is provided to engage an external clutch gear element 117 carried by the spline shaft when the collar is moved to the left from position shown in Figure 2. In the position of parts illustrated by Figure 2 the clutch gear element 17 is engaged with a second internal gear 119 of the gear ring. In this position the drive shaft 87 drives the ring gear through gears 121 and 123 and the ring gear drives the spline shaft through gears 119 and 117. The rotated spline shaft drives the hub member 91 because of its splined relation thereto.

In this modified form it may be noted that the external-internal gearing differs from that shown by Figure 1. It has first a step-down followed by a step-up instead of two successive steps upward as in the first form. Also the countershaft is driven from the gear ring instead of from the driving shaft making a very compact arrangement. The provision for reverse driving is not illustrated. It may be accomplished in any convenient way, as for example by introducing a sliding idler gear in constant engagement with gear 105 and slidably intermeshed with gear 93.

I claim:

1. In a transmission device, aligned driving and driven shafts, a sleeve within which said driven shaft is slidable and non-rotatably mounted, means to drive said sleeve from said driving shaft, driving means carried by said sleeve whereby the power transmitted to said sleeve from said driving shaft is transmitted from said sleeve, a bearing for said sleeve, a gear ring eccentrically mounted around said shafts, means to drive said gear ring from said driving shaft, gearing including an integral driven shaft gear, a gear member on the gear ring for cooperation therewith, and means to reciprocate said driven shaft to move said driven shaft to a position where its external gear is engaged with the cooperating gear on the gear ring.

2. In a transmission device, aligned driving and driven shafts, a sleeve telescopically and non-rotatably associated with said driven shaft, a bearing for said sleeve for supporting said sleeve and driven shaft, a gear on said sleeve, a gear on said driven shaft, a countershaft, means to selectively drive said driven shaft and sleeve from the countershaft through one or the other of said gears and means whereby said driven shaft may be driven by said driving shaft at other speed ratios when adjusted longitudinally to predetermined positions relative to said sleeve.

3. The invention defined by claim 2, said last named means comprising a gear ring driven by said driving shaft, clutch elements on said driving and driven shaft, cooperating gear elements on said gear ring and driven shaft, and means positioned between said first mentioned gears on the sleeve and driving shaft to axially reciprocate said driven shaft through the gear assembled thereon to secure a direct clutch drive between the driving and driven shafts or a drive at a predetermined ratio between said shafts through said gear ring.

4. In a transmission device, aligned driving and driven shafts, a sleeve splined for sliding relation to said driven shaft, a gear secured to said sleeve, a gear slidably positioned on said shaft, slotted means between said gears maintaining a spaced relation between the same, a collar slidable on said slotted means having a part projecting through said slot and into engagement with said driven shaft to slide the latter a plurality of power transmission mechanisms operative between said driving and driven shafts and effective upon axial movements of said driven shaft to predetermined positions of adjustment.

5. In a transmission, aligned driving and driven shafts and a sleeve relative to which the driven shaft is slidable but nonrotatable, a gear ring driven by said driving shaft, an additional gear on said gear ring, gear teeth integral with said driven shaft to be engaged with said additional gear on the gear ring in one axial position of said driven shaft, and clutch teeth on said driving shaft to engage said gear in another position of axial adjustment, a gear on said sleeve, a gear slidable relative to said driven shaft, driven gear means movable to engage one or the other of said last named gears, means between said gears to slidably move said driven shaft to positions of adjustment whereby the driven shaft is driven either through the clutch or through the gear ring.

6. The invention defined by claim 5, said last named means comprising a collar having lugs to engage said shaft and a bushing along which said collar moves, said bushing spacing said gears and having slots through which the lugs of the collar pass.

7. In a transmission, aligned shafts, means to effect an axial sliding movement of one shaft relative to the other, a plurality of driving mechanisms associated with said shafts and operative upon axial movement of one shaft to predetermined positions of adjustment, a sleeve rotatable with, but held from sliding movement with one of said shafts, a gear rotating with said sleeve, a driven countershaft, means to drive said gear from the countershaft, to drive the driven shaft at a predetermined speed ratio.

8. In a transmission device, aligned driving and driven shafts, a sleeve within which said driven shafts is slidable and non-rotatably mounted, means to drive said sleeve from said driving shaft, driving means carried by said sleeve whereby the power transmitted to said sleeve from said driving shaft is transmitted therefrom and a bearing for rotatably supporting said sleeve.

In testimony whereof I affix my signature.

CLAUDE H. STERLING.